United States Patent
Suzuki et al.

(10) Patent No.: US 8,395,882 B2
(45) Date of Patent: Mar. 12, 2013

(54) DIELECTRIC CERAMIC AND MULTILAYER CERAMIC CAPACITOR

(75) Inventors: Hironori Suzuki, Omihachiman (JP); Hideyasu Onishi, Higashiomi (JP); Kazuo Muto, Izumo (JP); Tomoyuki Nakamura, Moriyama (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 0 days.

(21) Appl. No.: 12/844,040

(22) Filed: Jul. 27, 2010

(65) Prior Publication Data

US 2010/0284126 A1  Nov. 11, 2010

Related U.S. Application Data

(63) Continuation of application No. PCT/JP2009/050480, filed on Jan. 15, 2009.

(30) Foreign Application Priority Data

Feb. 5, 2008 (JP) ................................. 2008-025505

(51) Int. Cl.
*H01G 4/06* (2006.01)
*C04B 35/00* (2006.01)

(52) U.S. Cl. ..................................... 361/321.5; 501/137
(58) Field of Classification Search .............. 361/321.4, 361/321.5, 321.2, 321.1, 312; 501/137
See application file for complete search history.

(56) References Cited

U.S. PATENT DOCUMENTS

| | | | | |
|---|---|---|---|---|
| 4,607,314 A | * | 8/1986 | Wada et al. ................. 361/321.4 |
| 5,259,885 A | * | 11/1993 | Sandhage ..................... 505/450 |
| 5,459,635 A | * | 10/1995 | Tomozawa et al. ........ 361/321.5 |
| 5,760,432 A | * | 6/1998 | Abe et al. ....................... 257/295 |
| 6,072,688 A | * | 6/2000 | Hennings et al. ............. 361/311 |
| 6,194,753 B1 | * | 2/2001 | Seon et al. ..................... 257/295 |
| 6,303,529 B1 | | 10/2001 | Wada et al. |
| 6,495,412 B1 | * | 12/2002 | Zhu et al. ....................... 438/240 |
| 6,624,462 B1 | * | 9/2003 | Kohara et al. ................. 257/310 |
| 6,878,968 B1 | * | 4/2005 | Ohnuma ......................... 257/75 |
| 7,042,141 B2 | * | 5/2006 | Funakubo et al. ............ 310/357 |
| 7,304,830 B2 | * | 12/2007 | Iwanaga ..................... 361/306.1 |
| 7,629,269 B2 | * | 12/2009 | Palanduz ....................... 438/761 |
| 7,633,210 B2 | * | 12/2009 | Ono et al. ...................... 310/328 |
| 2005/0188916 A1 | * | 9/2005 | Riman et al. ..................... 117/21 |
| 2006/0221550 A1 | | 10/2006 | Ryu et al. |
| 2007/0069610 A1 | * | 3/2007 | Ono et al. ...................... 310/328 |
| 2008/0206561 A1 | * | 8/2008 | Yokoyama et al. ........... 428/402 |
| 2009/0103238 A1 | | 4/2009 | Ryu et al. |

FOREIGN PATENT DOCUMENTS

| | | |
|---|---|---|
| JP | 2003-137649 A | 5/2003 |
| JP | 2005-272295 A | 10/2005 |
| JP | 2005-289737 A | 10/2005 |

OTHER PUBLICATIONS

International Search Report and Written Opinion of the International Searching Authority, mailed Apr. 21, 2009 in PCT/JP2009/050480.

* cited by examiner

*Primary Examiner* — David M Sinclair
(74) *Attorney, Agent, or Firm* — Dickstein Shapiro LLP

(57) ABSTRACT

In a dielectric ceramic having crystal grains and containing a perovskite in which the A site contains Ba and the B site contains Ti. as a main component, the crystal orientations are aligned in substantially the same direction within the crystal grains. Some of Ba may be replaced with Ca and/or Sr, and some of Ti may be replaced with Zr and/pr Hf. This achieves a dielectric ceramic which has a high dielectric constant and has favorable AC electric field characteristics in which the change in dielectric constant is small even with changes in applied electric field.

15 Claims, 11 Drawing Sheets

DIELECTRIC CERAMIC AND MULTILAYER CERAMIC CAPACITOR

This is a continuation of application Serial No. PCT/JP2009/050480, filed Jan. 15, 2009, which is incorporated herein by reference.

TECHNICAL FIELD

The present invention relates to a dielectric ceramic and a laminated ceramic capacitor, and more particularly relates to a dielectric ceramic which is able to respond to various levels of AC applied voltages, and a laminated ceramic capacitor using the dielectric ceramic.

BACKGROUND ART

Conventionally, laminated ceramic capacitors are typically manufactured as follows.

First, ceramic green sheets with a predetermined conductive pattern formed on their surfaces are manufactured, and a predetermined number of the ceramic green sheets is then stacked, sandwiched between ceramic green sheets with no conductive pattern formed, and subjected to thermo-compression bonding to form a integrated ceramic laminate.

Next, this ceramic laminate is calcined, thereby obtaining a ceramic sintered body with internal electrodes buried therein. Then, external electrodes are formed on the outer surface of the ceramic sintered body, thereby manufacturing a laminated ceramic capacitor. It is to be noted that the external electrodes are formed by providing a conductive paste containing conductive metal powder and glass frit on the outer surface of the laminate and firing the conductive paste.

In addition, a high dielectric constant is required in this type of laminated ceramic capacitor, for the dielectric ceramic in order to achieve reduction in size and increase in capacitance. Therefore, $BaTiO_3$-based materials have been widely used as the ceramic material.

The $BaTiO_3$ is a ferroelectric, and large numbers of core-shell structures and the like have been found in which an additive is dispersed only in the vicinity of surface layers of the crystal grains in order to change various dielectric characteristics. On the other hand, some ceramic materials are nearly homogeneous in terms of composition and the crystal system throughout crystal grains, as described in Patent Document 1. The use of such a homogeneous structure relatively facilitates improvement in the dielectric constant.

Patent Document 1: Japanese Patent Application Laid-Open No. 11-273985

DISCLOSURE OF THE INVENTION

Problem to be Solved by the Invention

Recently, the electric field applied to laminated ceramic capacitors has come to take various values. In particular, the acceptable value of the output voltage in laminated ceramic capacitors placed in the vicinity of an IC may be reduced to AC 0.1 V or less in some cases, with a reduction in voltage for the load IC.

In such a case, the use of a dielectric ceramic material which is nearly homogeneous in terms of composition and crystal system throughout crystal grains as in the case of Patent Document 1, even has a problem in that the dielectric constant is significantly decreased as the applied voltage is reduced.

The present invention has been achieved in view of the problem described above, and an object of the present invention is to provide a dielectric ceramic which has a high dielectric constant and has favorable AC electric field characteristics in which the change in dielectric constant is small even with changes in an AC electric field, and a laminated ceramic capacitor using the dielectric ceramic.

Means for Solving the Problem

Earnest studies carried by the present inventors in order to achieve the object described above have found that a dielectric ceramic which has a high dielectric constant and has favorable AC electric field characteristics in which the change in dielectric constant is small even with changes in an AC electric field can be obtained when crystal orientations in the crystal grains are aligned within the crystal grain.

The present invention has been made based on such findings, and relates to a dielectric ceramic including a crystal grain and crystal grain boundary, and having a composition containing, as its main component, a perovskite-type compound represented by the general formula $ABO_3$ (A inevitably contains Ba, and may also contain at least one of Ca and Sr, whereas B inevitably contains Ti, and may also contain at least one of Zr and Hf), wherein the crystal orientations in the crystal grain are aligned in the same direction within the crystal grain.

Also, the dielectric ceramic of the present invention is preferably characterized in that the main component is $BaTiO_3$.

The present invention also relates to a laminated ceramic capacitor including a plurality of stacked dielectric layers, internal electrodes arranged between the dielectric layers, and external electrodes electrically connected to the internal electrodes, wherein the dielectric layers are formed of the dielectric ceramic described above.

Advantageous Effects of the Invention

In the dielectric ceramic according to the present invention, the crystal orientations in the crystal grain are aligned in the same direction within the crystal grain, and thus the stability with respect to the change in electric field in a ferroelectric domain is increased, thereby allowing the AC electric field characteristics to be improved.

In addition, the dielectric layers in the laminated ceramic capacitor according to the present invention are formed of the dielectric ceramic described above, and thus the laminated ceramic capacitor operates as a stable capacitance component even in applications for low voltage driving.

DESCRIPTION OF REFERENCE SYMBOLS

| | |
|---|---|
| 2 | ceramic sintered body |
| 3 | dielectric layer |
| 4, 5 | internal electrodes |
| 8, 9 | external electrodes |

BEST MODE FOR CARRYING OUT THE INVENTION

Next, a dielectric ceramic according to the present invention will be described in detail.

The dielectric ceramic according to the present invention includes crystal grains and crystal grain boundaries, and contains $BaTiO_3$ as its main component. The crystal grains herein refer to crystal grains composed of a main component composition, and include no particles with a heterogeneous component. In addition, the crystal grain boundaries also include grain boundary triplet points.

In the dielectric ceramic according to the present invention, the crystal orientations in the crystal grain are aligned in the same direction within the crystal grain. This means that crystal lattice fringes observed under a TEM (transmission-type electron microscope) or the like are aligned in the same direction substantially throughout the crystal grain, and means that the crystal grain has no interface therein at which the crystal orientation is changed. When the crystal grain has this structure, the AC electric field characteristics of the dielectric ceramic can be improved.

Further, a main component of $BaTiO_3$ increases the absolute value of the dielectric constant, and also enhances the effect of improving the AC electric field characteristics.

In addition, if necessary, it is also preferable to substitute some of Ba with any one of Ca and Sr, and it is also preferable to substitute some of Ti with any one of Zr and Hf.

Furthermore, if necessary, the dielectric ceramic according to the present invention preferably contains, as an accessory component, a rare-earth element, Mn, Mg, Si, etc., and may contain Y, Cr, Fe, V, Mo, W, Nb, Co, Ni, Cu, etc. It is to be noted that the existence form of these accessory components in the dielectric ceramic is not restricted provided that the object of the present invention is damaged. However, since the crystal orientations are aligned in the same direction throughout the crystal grain, it is preferable that the accessory components be in a solid solution within the crystal grain, in order to also prevent the presence of a heterogeneous solid solution of the accessory components.

Figure 1:
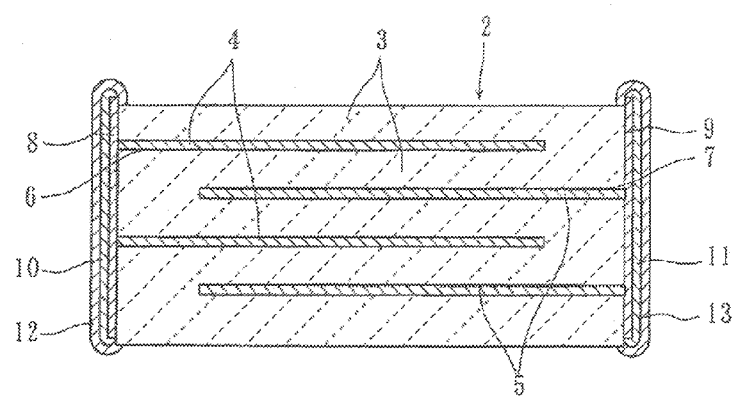
FIG. 1 is a cross-sectional view schematically illustrating am embodiment of a laminated ceramic capacitor according to the present invention.

Next, a laminated ceramic capacitor according to the present invention will be described in detail with reference to FIG. 1.

The laminated ceramic capacitor includes a ceramic sintered body 2 composed of alternately stacked dielectric layers 3 and internal electrodes 4, 5, external electrodes 8, 9 formed on the outer surface of the ceramic sintered body 2, first plating layers 10, 11 composed of nickel, copper, or the like formed on the surfaces of the external electrodes 8, 9, and second plating layers 12, 13 composed of solder, tin, or the like are further on the surfaces of the first plating layers 10, 11.

The internal electrodes 4 are drawn toward one end surface 6 and electrically connected to the external electrode 8, whereas the internal electrodes 5 are drawn toward the other end surface 7 and electrically connected to the external electrode 9, in such a way that an electrostatic capacitance can be acquired via the dielectric layers 3.

As the material for forming the internal electrodes 4, 5, low-cost nickel, copper, silver, and alloys containing the metals are preferably used.

As the material for forming the external electrodes 8, 9, the same material as in the case of the internal electrodes 4, 5 can be used, and further, silver, palladium, silver-palladium alloys, etc. can also be used. The external electrodes 8, 9 are formed by providing a conductive paste obtained by the addition of glass frit to such a metal powder and firing the conductive paste.

In addition, the crystal orientations in a crystal grain needs to be aligned in the same direction within the crystal grain in the dielectric ceramic constituting the dielectric layers 3. More specifically, what is necessary is that crystal orientations in the crystal grains of the main raw material powder are aligned in the same direction, and while the production method for the dielectric ceramic is not particularly limited, those production methods which provide generally high crystallinity are preferable. For example, high speed synthesis at a relatively high temperature for a short period of time is preferably carried out in the case of a solid phase method, in order to enhance the dispersibility $BaCO_3$ and $TiO_2$ as starting materials. In addition, a wet synthesis method such as hydrothermal synthesis may be used, and in this case, it is preferable that a heat treatment at a high temperature for a short period of time ensure that inter-lattice hydroxyl groups in the grain are removed.

In addition, when mixing an accessory component into the main raw material powder described above, it is preferable that the accessory component be not brought into a solid solution within the crystal grain during calcination. For this purpose, it is necessary to adjust the grinding condition appropriately so as not to non-uniformly damage the surfaces of the dielectric ceramic powder particles. In addition, it is also preferable to remove highly reactive fine particles in the case of using the dielectric ceramic powder particles and powder particles of the accessory components.

In either case, it is vital to select a dielectric ceramic powder containing barium titanate as its main component in which crystal orientations in the grains are aligned in the same direction.

Example

Multiple example samples (laminated ceramic capacitors) in which crystal orientations in a crystal grain are aligned in the same direction and multiple comparative example samples (laminated ceramic capacitors) in which crystal orientations in a crystal grain are not aligned in the same direction were manufactured, and the effects of the respective samples on AC electric field characteristics were examined.

Preparation of Example Sample

First, a main raw material powder A composed of $BaTiO_3$ was prepared. The observation of crystal grains of the main raw material powder A under TEM confirmed that crystal orientations were aligned in the same direction throughout crystal grains.

Figure 2:
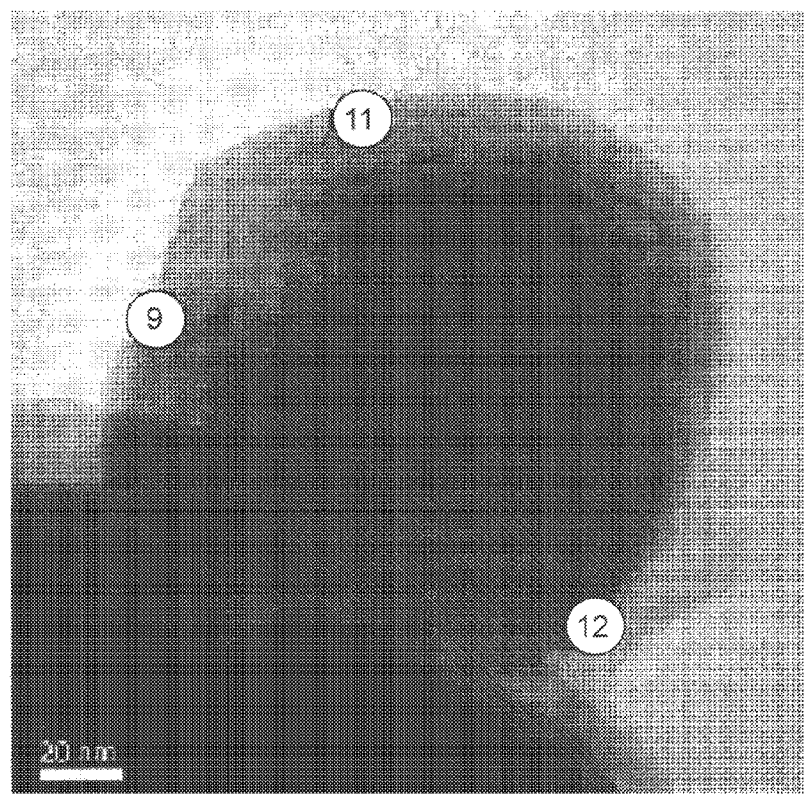
FIG. 2 is a TEM image of a main raw material powder A used in an example.

FIG. 2 is a TEM image of the main raw material powder A. In addition, the c/a axis ratio, which indicates the crystallinity of the main raw material powder A, was 1.010.

Next, the respective powders of $BaCO_3$, $Dy_2O_3$, $Y_2O_3$, $MnCO_3$, $MgCO_3$, CuO, and $SiO_2$ were prepared as additives of accessory components.

Then, the main raw material powder A and the respective additives of accessory components were weighed and mixed in such a way that the composition was 100 $BaTiO_3$+0.8Dy+0.2 Y+0.2 Mn+1.0 Mg+0.7 Ea+0.3 Cu+1.3 Si, thereby producing a ceramic raw material powder A.

An ethanol based organic solvent and a polyvinyl butyral based binder were added to the ceramic raw material powder A, and wet mixing was carried out to obtain a ceramic slurry.

The obtained ceramic slurry was subjected to sheet forming by a doctor blade method to obtain a ceramic green sheet.

The obtained ceramic green sheet was subdivided by cutting into a predetermined rectangular shape, and a conductive paste containing a Ni metal powder was applied onto the surfaces of the rectangular ceramic green sheets so as to provide the conductive paste in a predetermined pattern shape. The multiple ceramic green sheets with the conductive paste applied were stacked so that the drawn sides of the paste were alternated, and subjected to pressure bonding to obtain a ceramic laminate.

The obtained ceramic laminate was heated to a temperature of 300° C. under a nitrogen atmosphere to remove the binder, and calcined at a temperature of 1200° C. for 2 hours under a reducing atmosphere composed of a $H_2$—$N_2$—$H_2O$ gas with an oxygen partial pressure of $10^{-10}$ MPa, thereby obtaining a ceramic sintered body.

Then, an Ag paste containing $B_2O_3$—$SiO_2$—BaO based glass frit was applied on each of both end surfaces of the ceramic sintered body, and fired at a temperature of 800° C. under a nitrogen atmosphere to form external electrodes electrically connected to the internal electrodes, thereby obtaining an example sample (laminated ceramic capacitor) with outer dimensions of 2.0 mm in length, 1.2 mm in width, and 1.0 mm in thickness. In the obtained example sample, the dielectric layers had a thickness of 1.0 µm per layer, the area of a section contributing to the electrostatic capacitance and opposed to the internal electrode was $1.8 \times 10^{-6}$ $m^2$ per layer, and the number of the dielectric layers contributing to the electrostatic capacitance was 100. A total of 8 example samples were manufactured as described above, and provided with sample numbers 1 to 8.

Preparation of Comparative Example Sample

A main raw material powder B was prepared which was composed of $BaTiO_3$ in which the crystal orientation varies from one location to the next in a crystal grain. It is to be noted that the crystal orientations were confirmed by observation under a TEM in the same way as in the case of the example samples.

Figure 3:
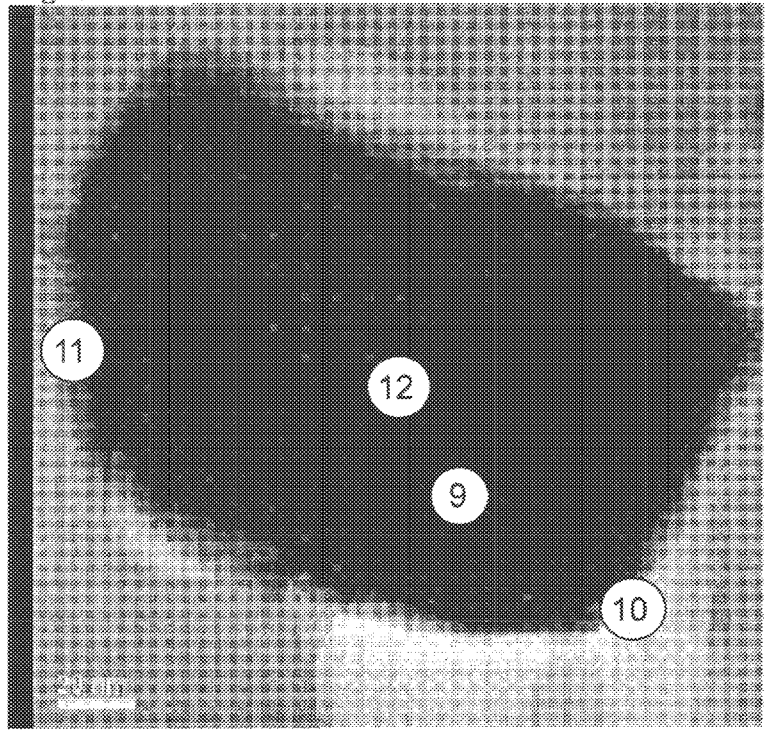
FIG. 3 is a TEM image of a main raw material powder B used in a comparative example.

FIG. 3 is a TEM image of the main raw material powder B. In addition, the c/a axis ratio, indicating the crystallinity of the main raw material powder, B was 1.009.

Next, the respective powders of $BaCO_3$, $Dy_2O_3$, $Y_2O_3$, $MnCO_3$, $MgCO_3$, CuO, and $SiO_2$ were prepared as additives of accessory components to produce a ceramic raw material powder B in accordance with the same method and procedure as in the case of the example samples. A total of 16 comparative example samples were manufactured as just described and provided samples of sample numbers 101 to 116.

Evaluation of Samples

For the respective samples according to the example and the comparative example, the specific dielectric constant ∈r, the dielectric loss tan δ, and the rate of change in dielectric constant with respect to the change in applied voltage were obtained.

More specifically, an automatic bridge measurement device was used to measure the specific dielectric constant ∈r and the dielectric loss tan δ under the conditions of a temperature of 25° C. and 1 kHz-0.5 Vrms.

In addition, the specific dielectric constant ∈r was also measured under the condition of 1 kHz-0.1 Vrms, and the rate of change in dielectric constant was obtained on the basis of the 1 kHz-0.5 Vrms, thereby evaluating the AC electric field characteristics.

Table 1 shows the measurement results.

TABLE 1

| Sample Number | Specific Dielectric Constant ∈r | Dielectric Loss tanδ (%) | Rate of Change in Dielectric Constant (%) |
| --- | --- | --- | --- |
| 1 | 3707 | 4.1 | −8.9 |
| 2 | 3798 | 4.0 | −8.9 |
| 3 | 3613 | 4.1 | −8.9 |
| 4 | 3616 | 4.0 | −8.8 |
| 5 | 3891 | 4.1 | −9.0 |
| 6 | 3747 | 4.0 | −9.0 |
| 7 | 3805 | 3.9 | −8.9 |
| 8 | 3841 | 4.0 | −8.9 |
| Average Value | 3752 | 4.0 | −8.9 |
| Standard Deviation | 101 | 0.1 | 0.1 |

TABLE 2

| Sample Number | Specific Dielectric Constant ∈r | Dielectric Loss tanδ (%) | Rate of Change in Dielectric Constant (%) |
| --- | --- | --- | --- |
| 101 | 3560 | 4.4 | −12.1 |
| 102 | 3879 | 4.6 | −13.1 |
| 103 | 3579 | 4.4 | −12.2 |
| 104 | 3525 | 4.5 | −11.9 |
| 105 | 3575 | 4.2 | −12.1 |
| 106 | 3971 | 4.7 | −13.5 |
| 107 | 3830 | 4.4 | −12.9 |
| 108 | 3836 | 4.5 | −13.0 |
| 110 | 3609 | 4.4 | −12.1 |
| 114 | 3651 | 4.6 | −12.3 |
| 115 | 3516 | 4.3 | −11.9 |
| 116 | 3661 | 4.4 | −12.0 |
| Average Value | 3683 | 4.5 | −12.5 |
| Standard Deviation | 155 | 0.1 | 0.6 |

As is clear from Tables 1 and 2, it has been found that while there is little difference in the specific dielectric constant ∈r and the dielectric loss tan δ between the example and the comparative example, the example has AC electric field characteristics improved as compared with the comparative example.

More specifically, the rate of change in dielectric constant was deceased by 12.5% on average with a standard deviation of 0.6 in the comparative example, whereas in the example, the rate of change in dielectric constant varied only by −8.9% on average, resulting in reduction in the rate of change, and a standard deviation of 0.1, i.e. almost no variation, and it has been thus found that the example has dramatically improved AC electric field characteristics as compared with the comparative example.

Next, the crystal grain of the ceramic sintered body of sample number 1, was observed under a TEM.

Figure 4:
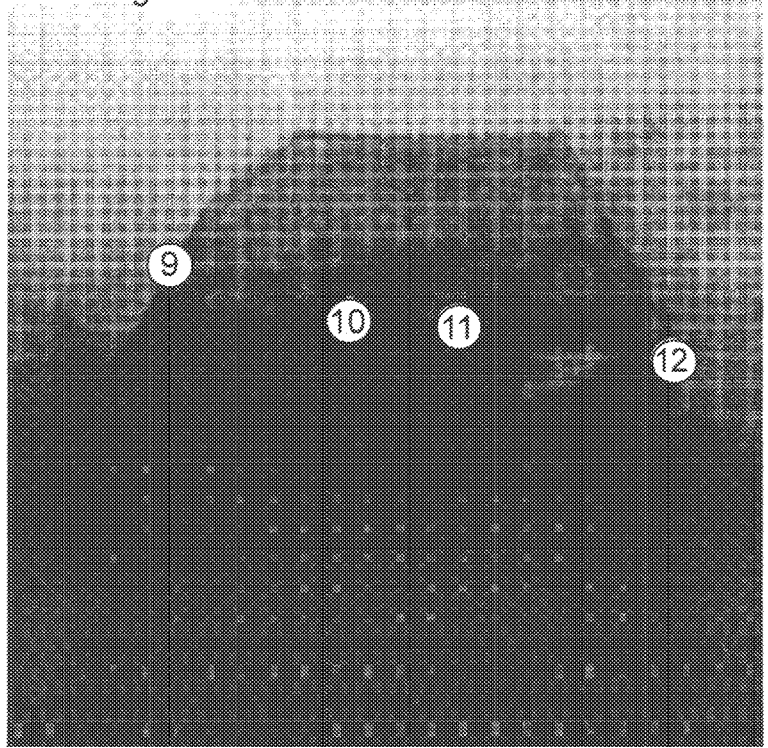
FIG. 4 is a TEM image of a crystal grain of an example sample.
Figure 5:
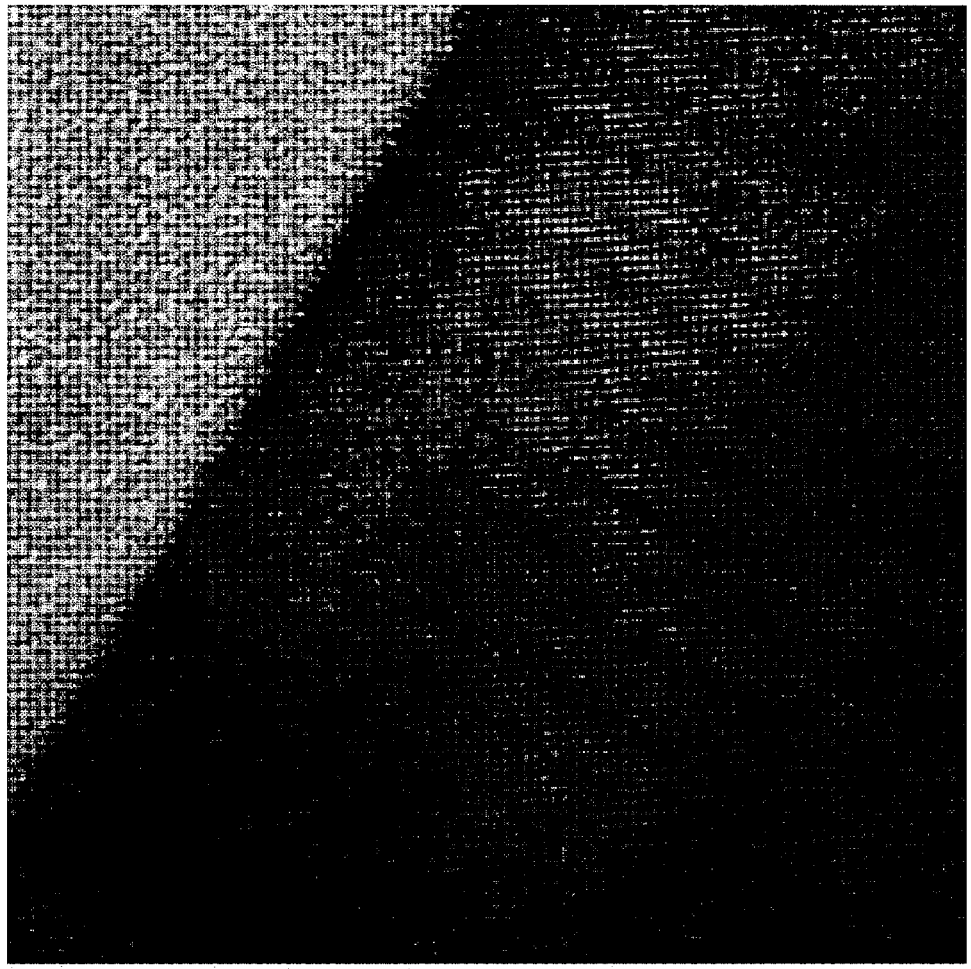
FIG. 5 is an enlarged TEM image of a region (1) in FIG. 4.
Figure 6:
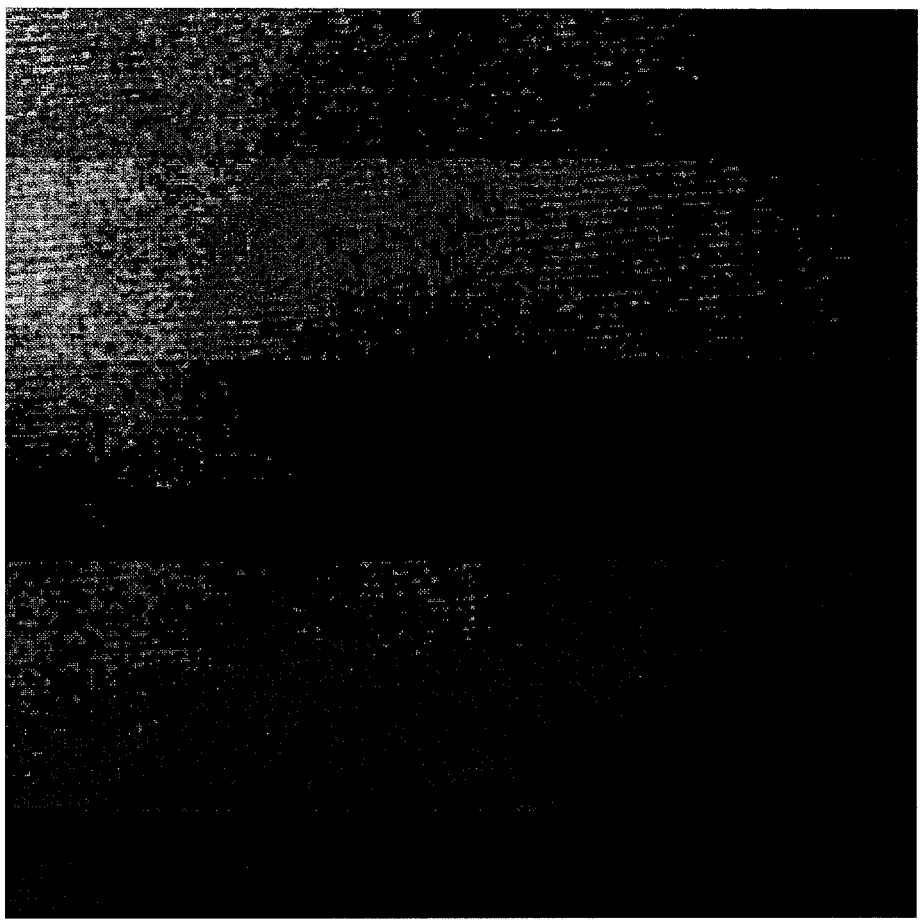
FIG. 6 is an enlarged TEM image of a region (2) in FIG. 4.
Figure 7:
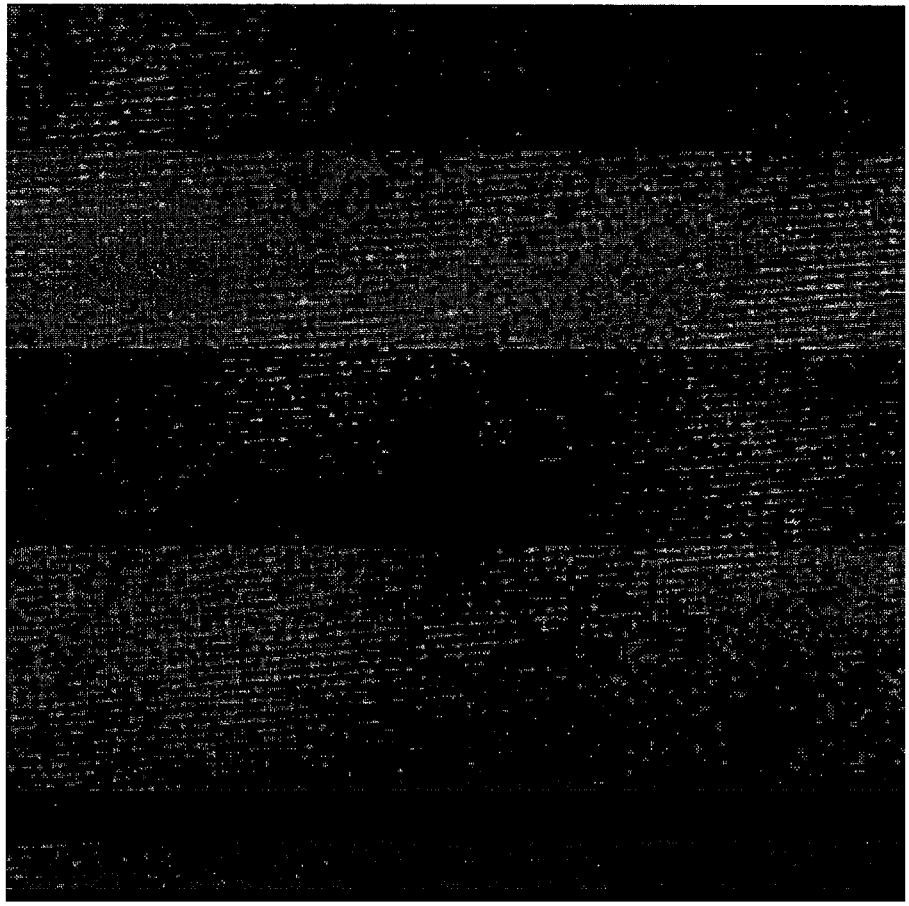
FIG. 7 is an enlarged TEM image of a region (3) in FIG. 4.
Figure 8:
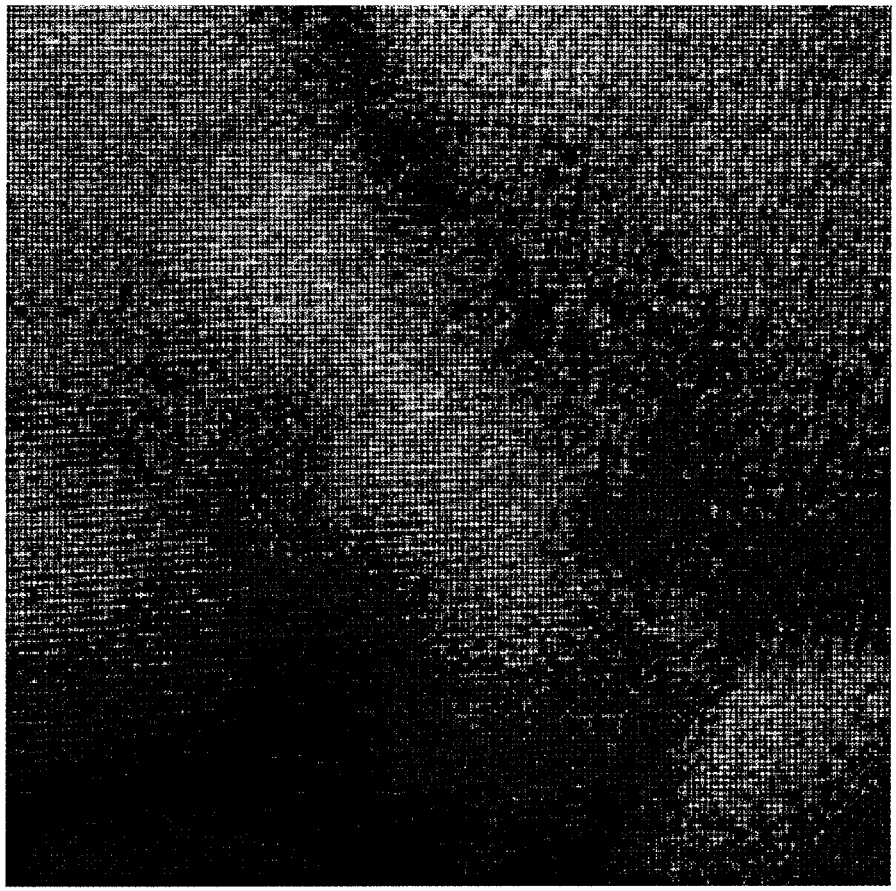
FIG. 8 is an enlarged TEM image of a region (4) in FIG. 4.

FIG. 4 is an observation photograph including, in the field of view, a crystal grain its periphery thereof in the sample of sample number 1.

FIGS. 5 to 8 are enlarged TEM images of the regions (1) to (4) shown in FIG. 4. It should be appreciated that these regions do not necessarily correspond to region indications (to the extent discernable) in FIG. 2.

Region (9) includes a crystal grain boundary, and the end of the crystal grain on the right-hand side of the crystal grain boundary is referred to below as a first end of the crystal grain to be observed. Regions (10) and (11) are inside the crystal grain. In region (12), a crystal grain boundary and a grain boundary triplet point are observed, and the end of crystal grain on the left-hand side from the crystal grain boundary and the grain boundary triplet point is referred to as a second end of the a crystal grain to be observed. It is to be noted that the average grain diameter of the crystal grain to be observed (i.e., the distance from first end to the second end) was 170 nm.

As is clear from FIGS. 5 to 8, it has been confirmed for sample number 1 that crystal lattice fringes are oriented in the same direction within the crystal grain, and the crystal orientations are thus aligned in the same direction. Further, Similar results have been obtained from TEM observation of sample numbers 2 to 8.

Next, crystal grain of the ceramic sintered body was observed under a TEM for the sample of sample number 101.

Figure 9:
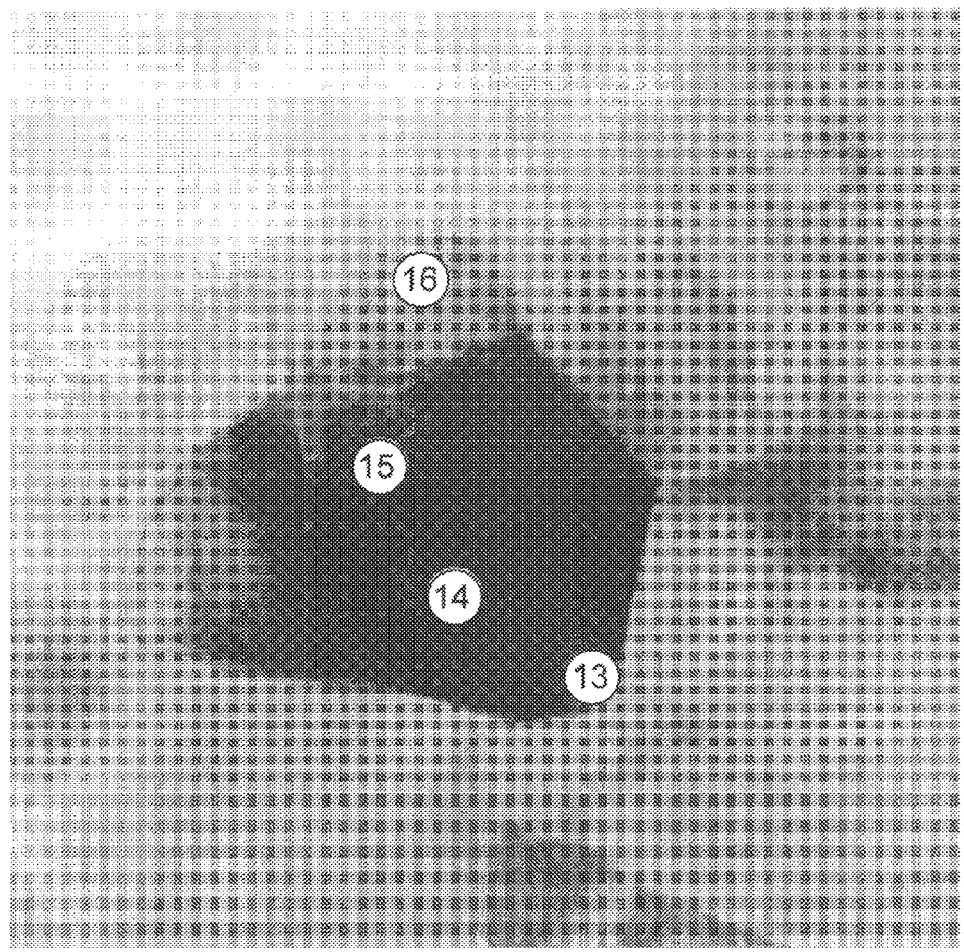
FIG. 9 is a TEM image of a crystal grain of a comparative example sample.

FIG. 9 is an observation photograph including, in the field of view, a crystal grain and a periphery thereof in the sample of sample number 101. It should be appreciated that these regions do not necessarily correspond to region indications (to the extent discernable) in FIG. 3.

FIGS. 10 to 13 are enlarged TEM images of the regions (13 to 16) shown in FIG. 9.

Region (13) includes a crystal grain boundary. Regions (14 to 16) are inside the crystal grain. It is to be noted that the average diameter for the crystal grain, i.e., the distance from the region (13) crystal grain boundary to the end of the crystal grain on the left-upper side from the region (13) crystal grain boundary, is 165 nm.

Figure 10:
FIG. 10 is an enlarged TEM image of a region (5) in FIG. 9.
Figure 11:
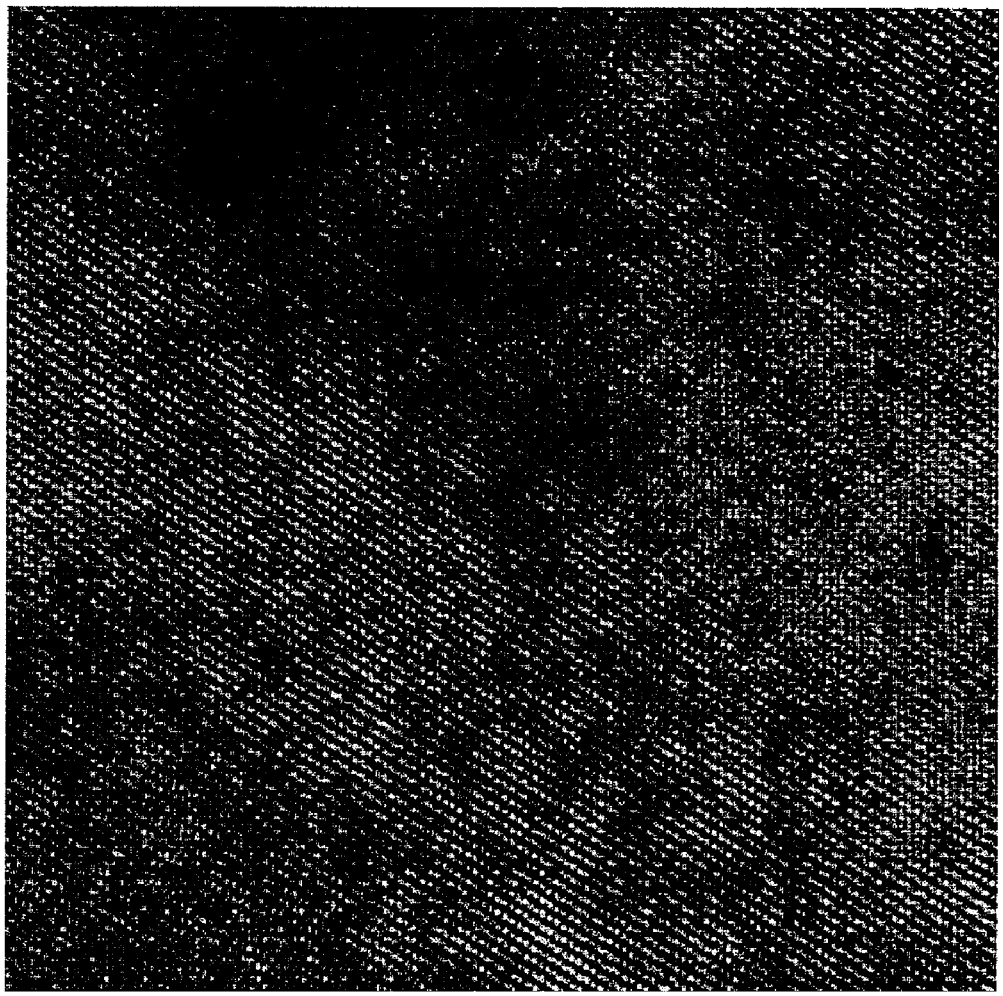
FIG. 11 is an enlarged TEM image of a region (6) in FIG. 9.
Figure 12:
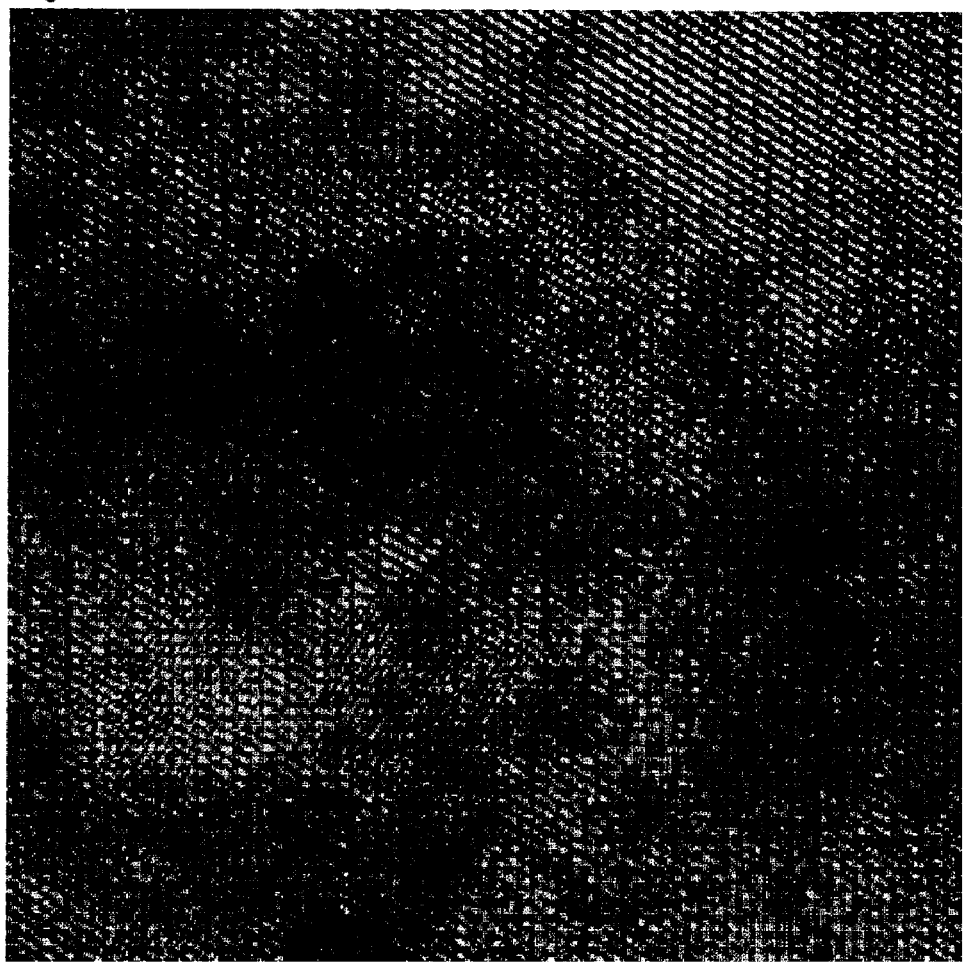
FIG. 12 is an enlarged TEM image of a region (7) in FIG. 9.
Figure 13:
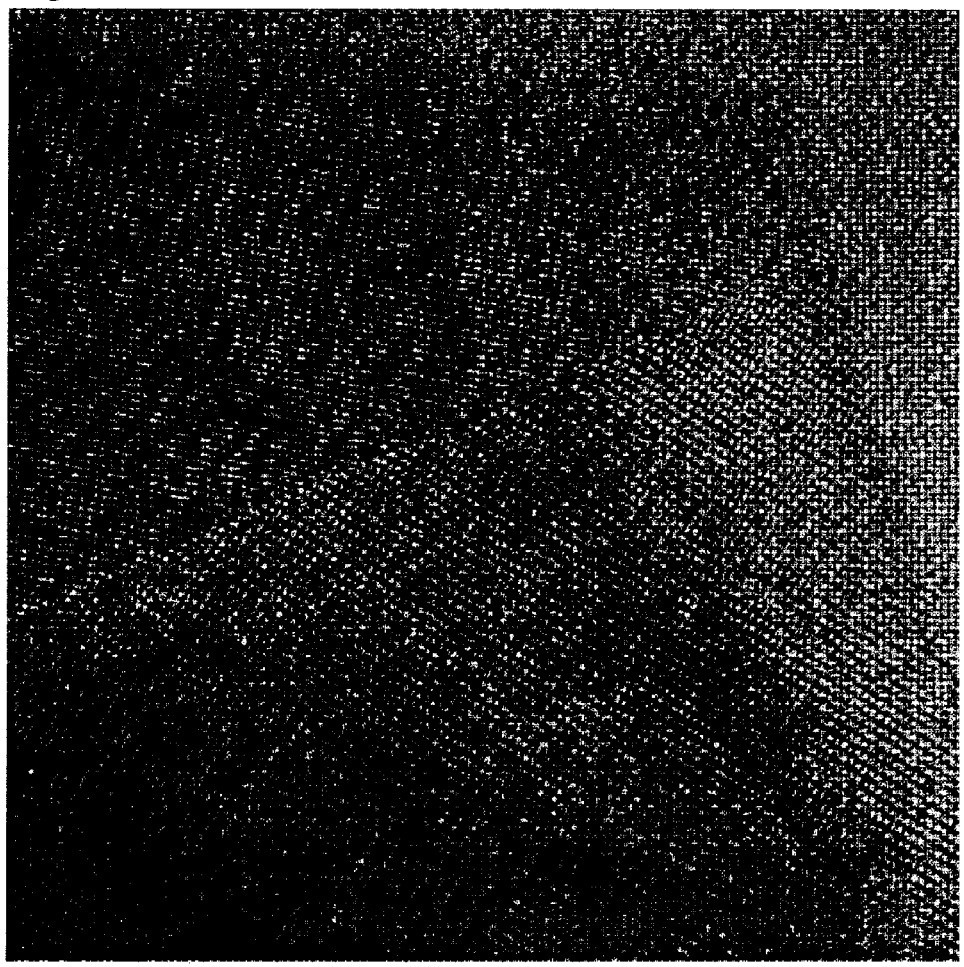
FIG. 13 is an enlarged TEM image of a region (9) in FIG. 9.

As is clear from FIGS. 10 to 12, it has been confirmed that the crystal orientations are aligned in the same direction in the regions (13 to 15), whereas as is clear from FIG. 13, it has been confirmed that the crystal grain has a region therein in which the crystal orientations are not aligned in the same direction within the crystal grain, on the ground that an interface (a linear section from a slightly upper right section to a slightly lower left section) at which the crystal orientation is changed is observed in region (16). Similar results have been obtained from TEM observation of the sample numbers 102 to 116.

As described above, it has been found that the samples of sample numbers 1 to 8 in which the crystal orientations are aligned in the same direction within the crystal grain have AC electric field characteristics dramatically improved compared with the samples of sample numbers 101 to 116 in which the crystal orientations are not aligned in the same direction. More specifically, it has been found that the samples of sample numbers 1 to 8 in which the crystal orientations are aligned in the same direction within the crystal grain have not only a favorable average value for the rate of change in dielectric constant, but also a small standard deviation, and also the variation in dielectric constant is reduced.

The invention claimed is:

1. A laminated ceramic capacitor comprising a plurality of stacked dielectric layers, internal electrodes arranged between dielectric layers, and external electrodes electrically connected to internal electrodes, wherein the dielectric layers are formed of a dielectric ceramic comprising crystal grains and grain boundaries which include grain boundary triplet points, the crystal grains having a composition containing, as its main component, a perovskite compound represented by the general formula $ABO_3$ in which A is Ba or Ba in combination with at least one of Ca and Sr, and B is Ti or Ti in combination with at least one of Zr and Hf, wherein the crystal orientations within each crystal grain are aligned in substantially the same direction.

2. The laminated ceramic capacitor according to claim 1, wherein the dielectric ceramic is $BaTiO_3$.

3. The laminated ceramic capacitor according to claim 1, wherein the perovskite compound is represented by the general formula $ABO_3$ in which A is Ba in combination with at least one of Ca and Sr, and B is Ti in combination with at least one of Zr and Hf.

4. The laminated ceramic capacitor according to claim 1, wherein the internal electrodes comprise Ni.

5. The laminated ceramic capacitor according to claim 4, wherein the dielectric ceramic and internal electrodes are a cofired stack of layers.

6. The laminated ceramic capacitor according to claim 5, wherein the dielectric ceramic is $BaTiO_3$.

7. The laminated ceramic capacitor according to claim 5, wherein the perovskite compound is represented by the general formula $ABO_3$ in which A is Ba in combination with at least one of Ca and Sr, and B is Ti in combination with at least one of Zr and Hf.

8. In a method for forming a laminated ceramic capacitor by forming a plurality of stacked dielectric layers with internal electrodes arranged between dielectric layers, and external electrodes electrically connected to the internal electrodes, the improvement which comprises selecting a dielectric ceramic comprising crystal grains and grain boundaries which include grain boundary triplet points, the crystal grains having a composition containing, as its main component, a perovskite compound represented by the general formula $ABO_3$ in which A is Ba or Ba in combination with at least one of Ca and Sr, and B is Ti or Ti in combination with at least one of Zr and Hf, wherein the crystal orientations within each crystal grain are aligned in substantially the same direction as the material of which the dielectric layers are formed.

9. The method according to claim 8, wherein the perovskite compound is $BaTiO_3$.

10. The method according to claim 8, wherein the perovskite compound is represented by the general formula $ABO_3$ in which A is Ba in combination with at least one of Ca and Sr, and B is Ti in combination with at least one of Zr and Hf.

11. The method according to claim 8, wherein the internal electrodes comprise Ni.

12. The method according to claim 11, wherein the method comprises stacking a plurality of green dielectric ceramic layers and at least two internal electrode precursor layers disposed at different interfaces between adjacent green dielectric layers, and cofiring the resulting stack.

13. The method according to claim 12, wherein the perovskite compound is $BaTiO_3$.

14. The method according to claim 12, wherein the perovskite compound is represented by the general formula $ABO_3$ in which A is Ba in combination with at least one of Ca and Sr, and B is Ti in combination with at least one of Zr and Hf.

15. The method according to claim 8, wherein the method comprises stacking a plurality of green dielectric ceramic layers with at least two internal electrode precursor layers disposed at different interfaces between adjacent green dielectric layers, and cofiring the resulting stack.

* * * * *